United States Patent
Donabedian et al.

(10) Patent No.: US 9,669,878 B2
(45) Date of Patent: Jun. 6, 2017

(54) VEHICLE CANOPY

(71) Applicant: Ford Global Technologies, LLC, Dearborn, MI (US)

(72) Inventors: Edgar Edward Donabedian, Livonia, MI (US); Darrin Neil Wagner, Bloomfield Hills, MI (US); Mark Keller, Birmingham, MI (US); Bruno M. Barthelemy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 109 days.

(21) Appl. No.: 14/620,041

(22) Filed: Feb. 11, 2015

(65) Prior Publication Data

US 2016/0023544 A1 Jan. 28, 2016

Related U.S. Application Data (60) Provisional application No. 62/027,476, filed on Jul. 22, 2014.

(51) Int. Cl.
*B62D 25/00* (2006.01)
*B62D 25/06* (2006.01)
*B60R 13/02* (2006.01)

(52) U.S. Cl.
CPC .......... *B62D 25/06* (2013.01); *B60R 13/0212* (2013.01)

(58) Field of Classification Search
CPC ............................ B62D 25/06; B60R 13/0212
USPC ...................... 296/187.05, 214; 280/748, 749
See application file for complete search history.

(56) References Cited

U.S. PATENT DOCUMENTS 5,460,409 A * 10/1995 Conner .................. B60R 21/06
                                                  160/327
6,712,390 B1 * 3/2004 Spinelli .................. B60R 21/11
                                                  280/748

* cited by examiner

*Primary Examiner* — Joseph D Pape
(74) *Attorney, Agent, or Firm* — Jason C. Rogers; Bejin Bieneman PLC (57) ABSTRACT

A vehicle canopy includes a vehicle body defining a roof opening. A roof is connected to the vehicle body across the roof opening. A headliner is supported by at least one of the vehicle body and the roof. A frame is supported by the vehicle body. A fabric partition is engaged with the frame and extends across the roof opening between the headliner and the roof. The fabric partition may assist in preventing occupant test dummies and/or other objects from moving through the roof opening.

20 Claims, 8 Drawing Sheets

VEHICLE CANOPY

CROSS-REFERENCE TO RELATED APPLICATIONS

The subject patent application claims priority to and all the benefits of U.S. Provisional Patent Application No. 62/027,476 filed on Jul. 22, 2014, which is herein incorporated by reference in its entirety.

BACKGROUND

A vehicle canopy includes a vehicle body defining a roof opening. Specifically, the vehicle body includes pillars and a roof frame that defines the roof opening. A roof is connected to the vehicle body across the roof opening. For example, the roof may be fixed to the roof frame of the vehicle body by welding, riveting, etc. A headliner is supported by at least one of the vehicle body and the roof. The headliner extends across the roof opening and provides an aesthetic appearance to the passenger compartment of the vehicle.

Vehicles are subject to a variety of collision tests, including those standardized by government agencies, such as the National Highway Traffic and Safety Agency (NHTSA) in the U.S. These tests can include, for example, a side impact pole test, in which the side of the vehicle is impacted against a stationary pole. These tests may also include rollover tests, in which the vehicle is rolled about a longitudinal axis. The performance of the canopy of the vehicle may be monitored during and after such tests. Design of the vehicle may include features that satisfy and/or improve performance during these various collision tests.

DETAILED DESCRIPTION

Figure 1:
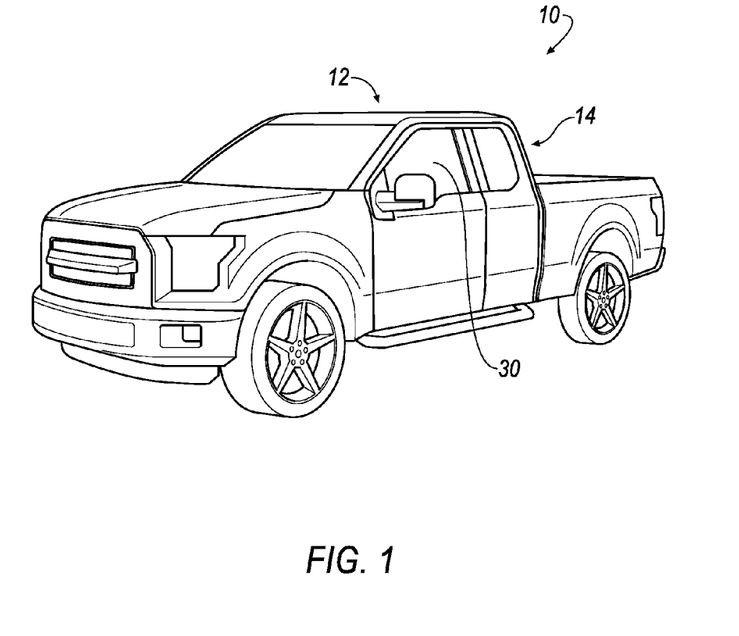
FIG. 1 is a perspective view of a vehicle.
Figure 2:
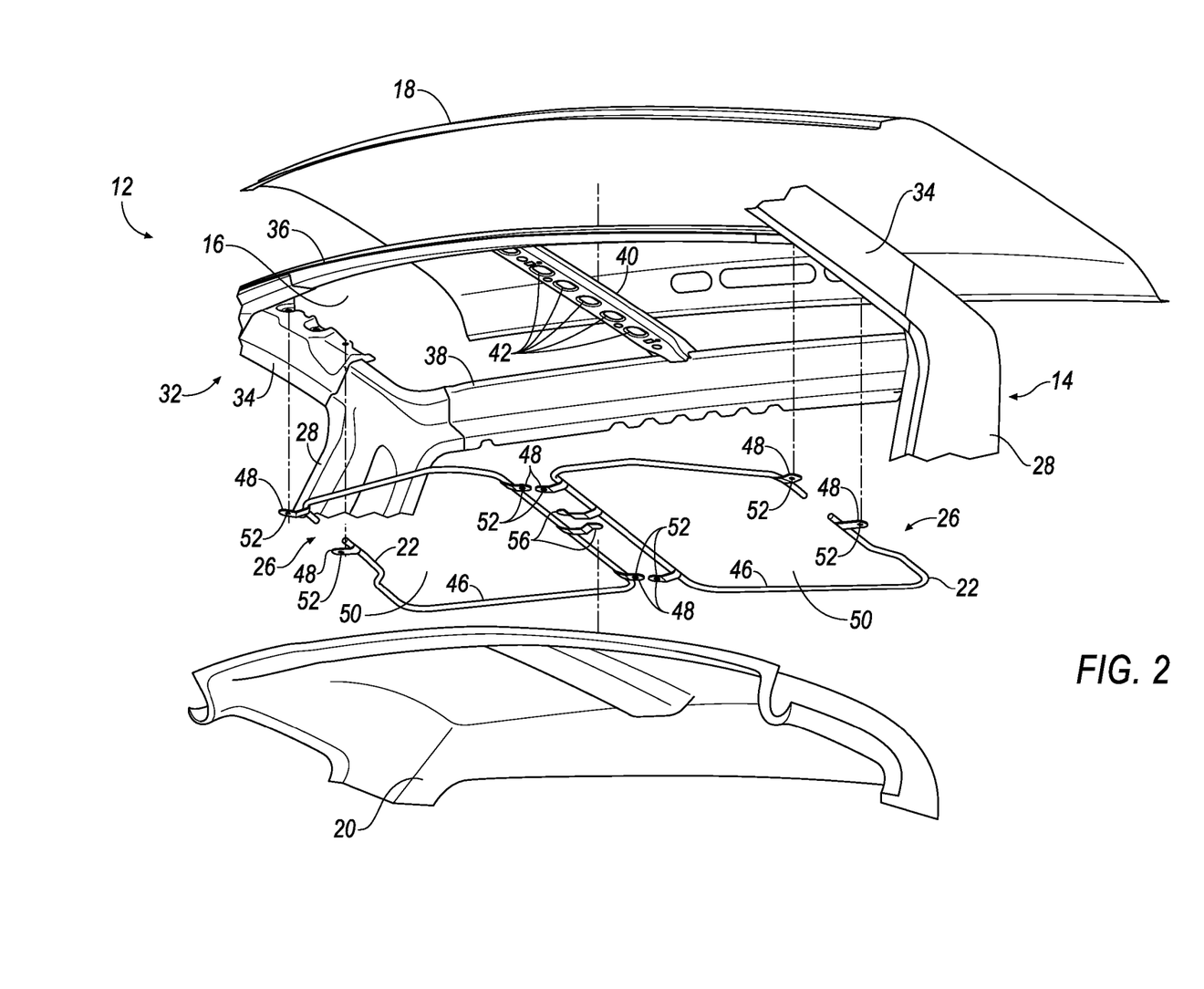
FIG. 2 is an exploded view of a first embodiment of a canopy of the vehicle including a vehicle body, a headliner, a roof, and a portion of an enclosure (with a frame of the enclosure shown and with a fabric partition of the enclosure not shown merely for illustrative purposes).

With reference to the Figures, wherein like numerals indicate like parts throughout the several views, a vehicle 10 is generally shown. With reference to FIG. 2, a canopy 12, 112, 212, 312 of the vehicle 10 includes a vehicle body 14 defining a roof opening 16. A roof 18 is connected to the vehicle body 14 across the roof opening 16. A headliner 20 is supported by at least one of the vehicle body 14 and the roof 18. A frame 22, 122, 222, 322 is supported by the vehicle body 14. A fabric partition 24, 124, 224, 324 is engaged with the frame 22 and extends across the roof opening 16 between the headliner 20 and the roof 18.

The frame 22, 122, 222, 322 and the fabric partition 24, 124, 224, 324 may assist in retaining occupant test dummies (not shown) and/or other objects (not shown) in the vehicle 10 during vehicle collision tests, e.g., vehicle rollover test, side pole test, etc. Specifically, during such vehicle collision tests, the frame 22, 122, 222, 322 and the fabric partition 24, 124, 224, 324 may prevent movement of occupant test dummies and/or other objects through the roof opening 16.

Figure 3:
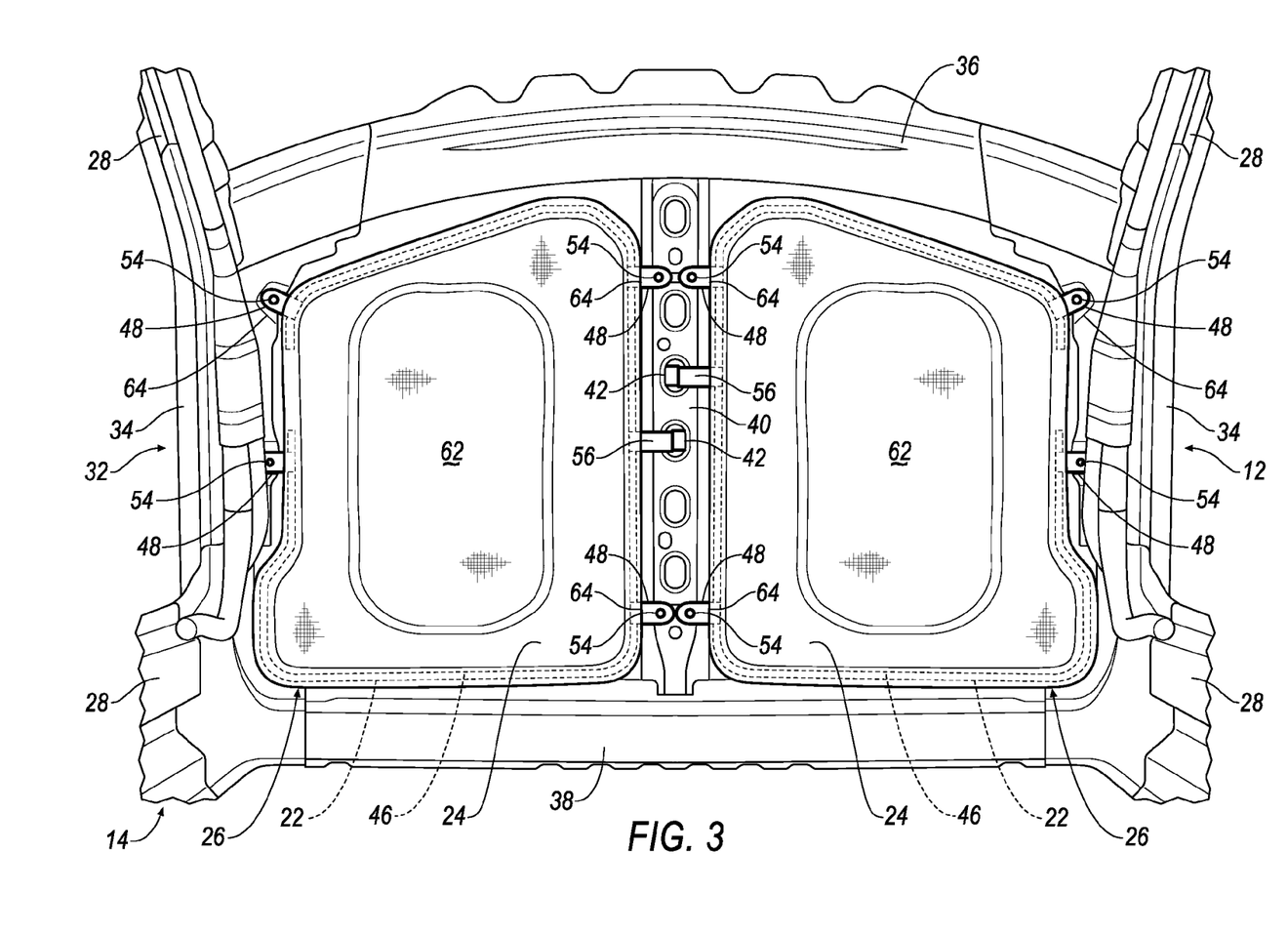
FIG. 3 is a bottom view of the canopy of FIG. 2 including the fabric portion of the enclosure mounted on the frame of the enclosure.
Figure 4:
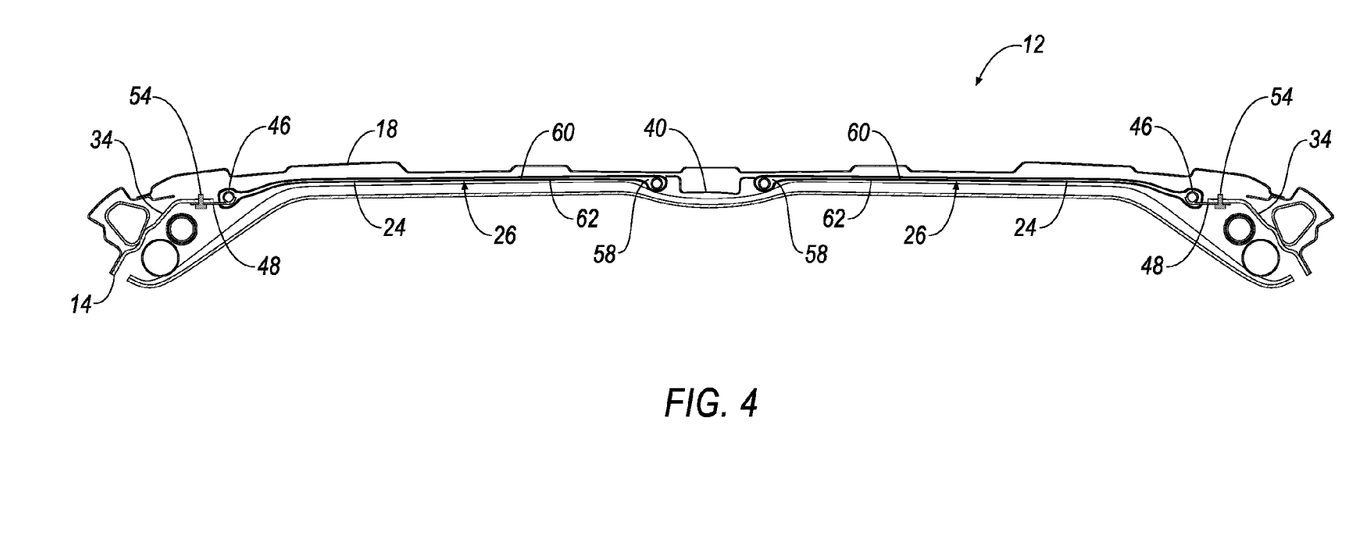
FIG. 4 is a cross-section of the canopy of FIG. 2.
Figure 5:
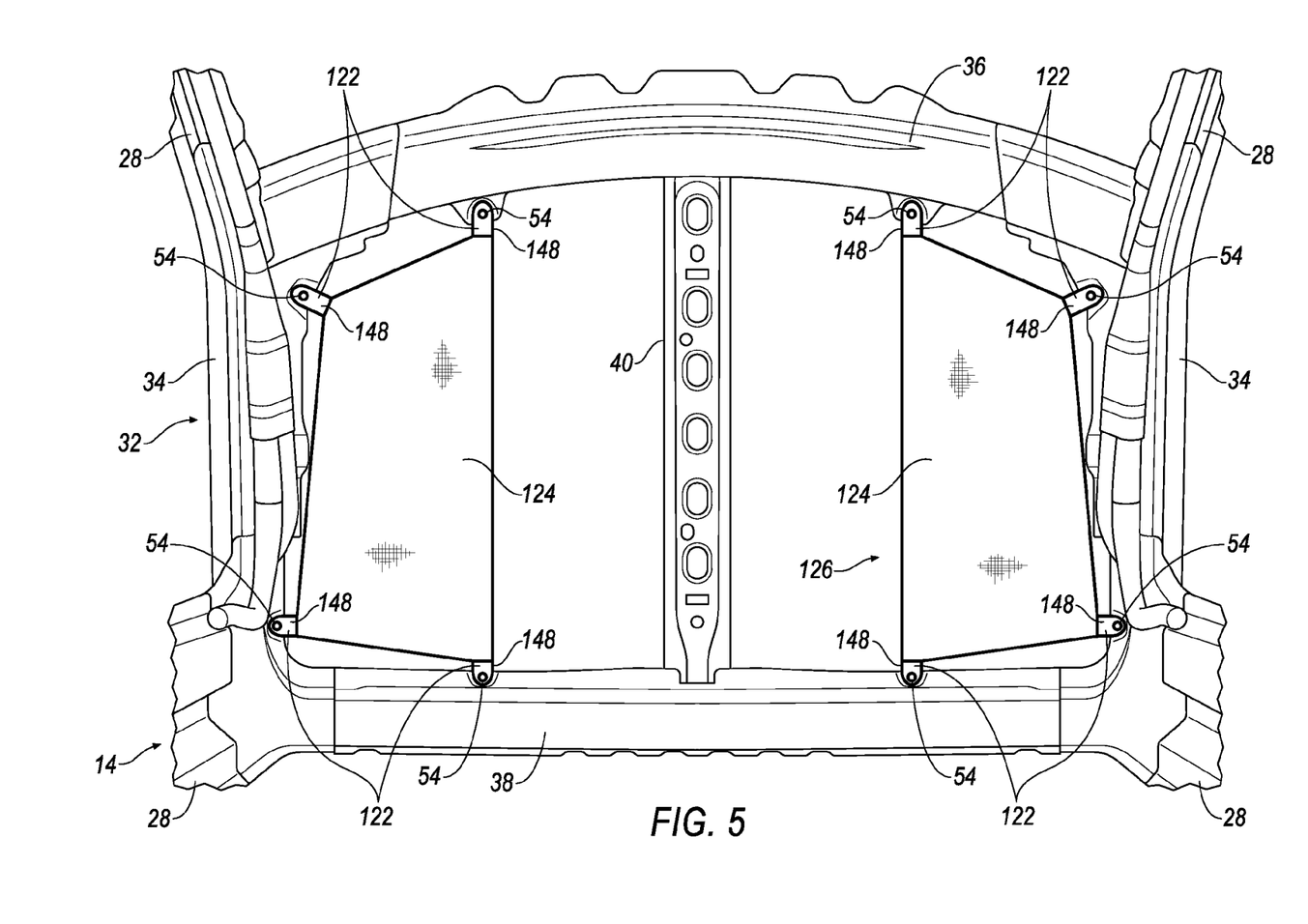
FIG. 5 is a bottom view of a portion of a second embodiment of the canopy.
Figure 6:
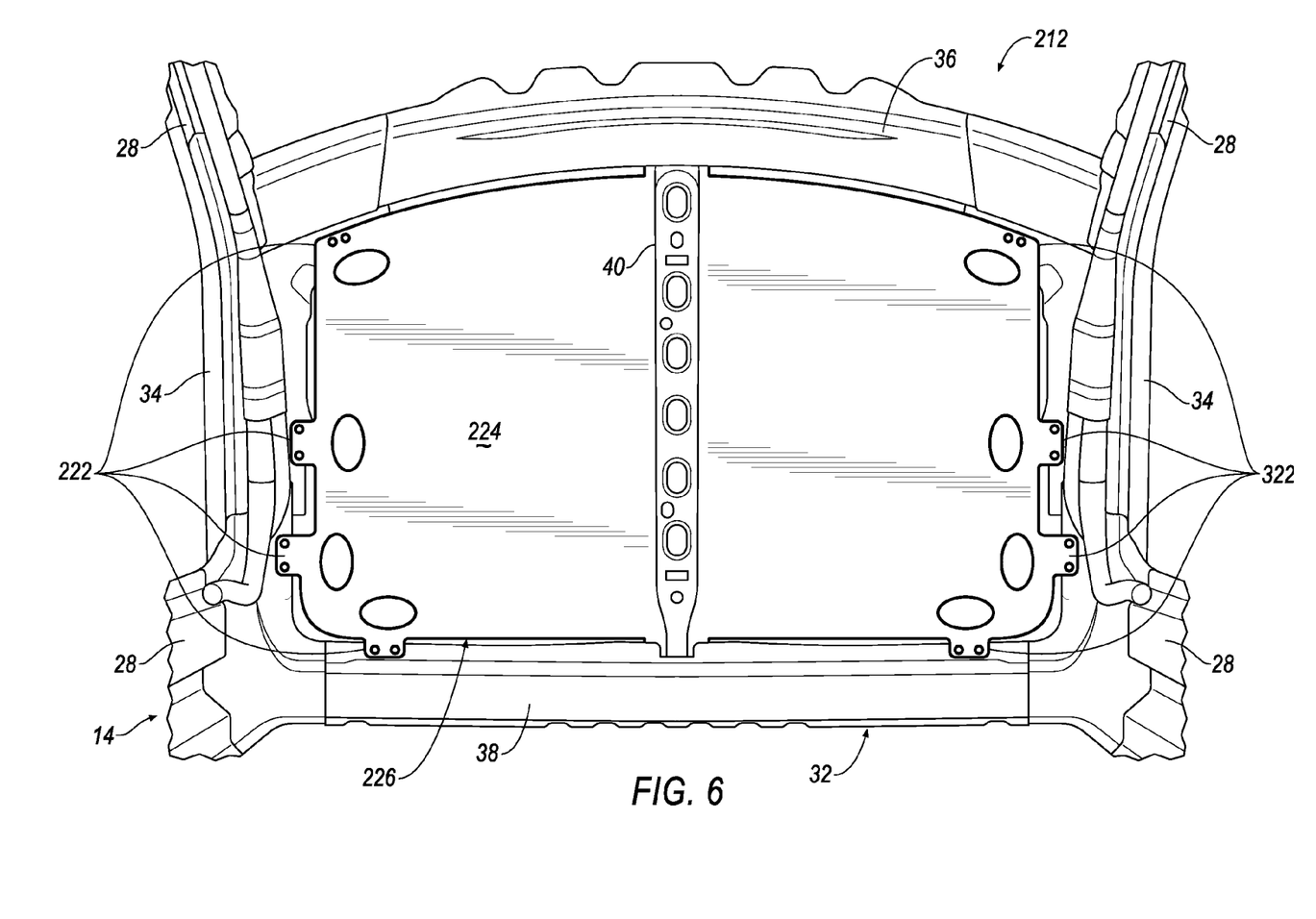
FIG. 6 is a bottom view of a portion of a third embodiment of the canopy.
Figure 7:
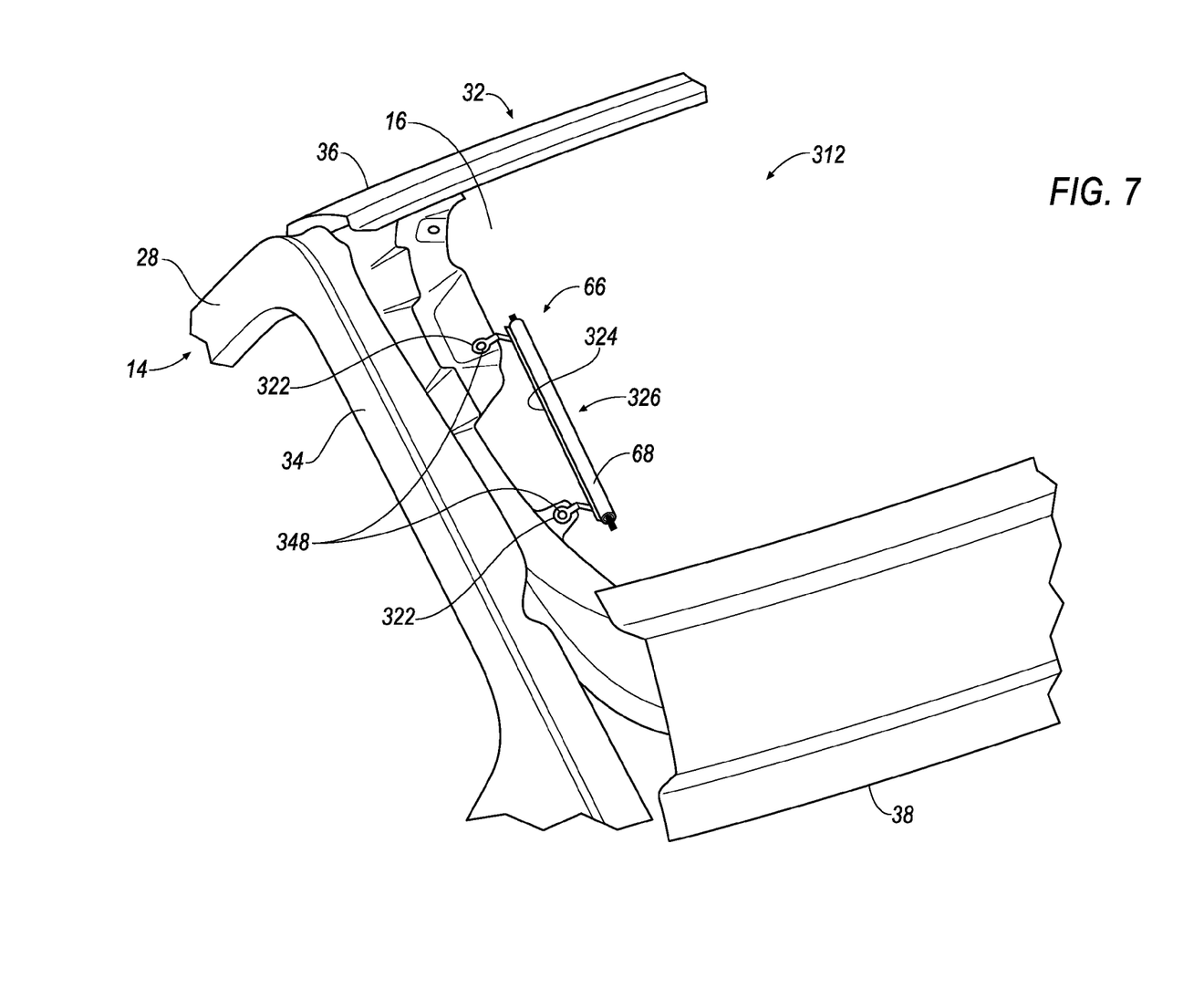
FIG. 7 is a top view of a portion of a fourth embodiment of the canopy with the roof removed for illustrative purposes.
Figure 8:
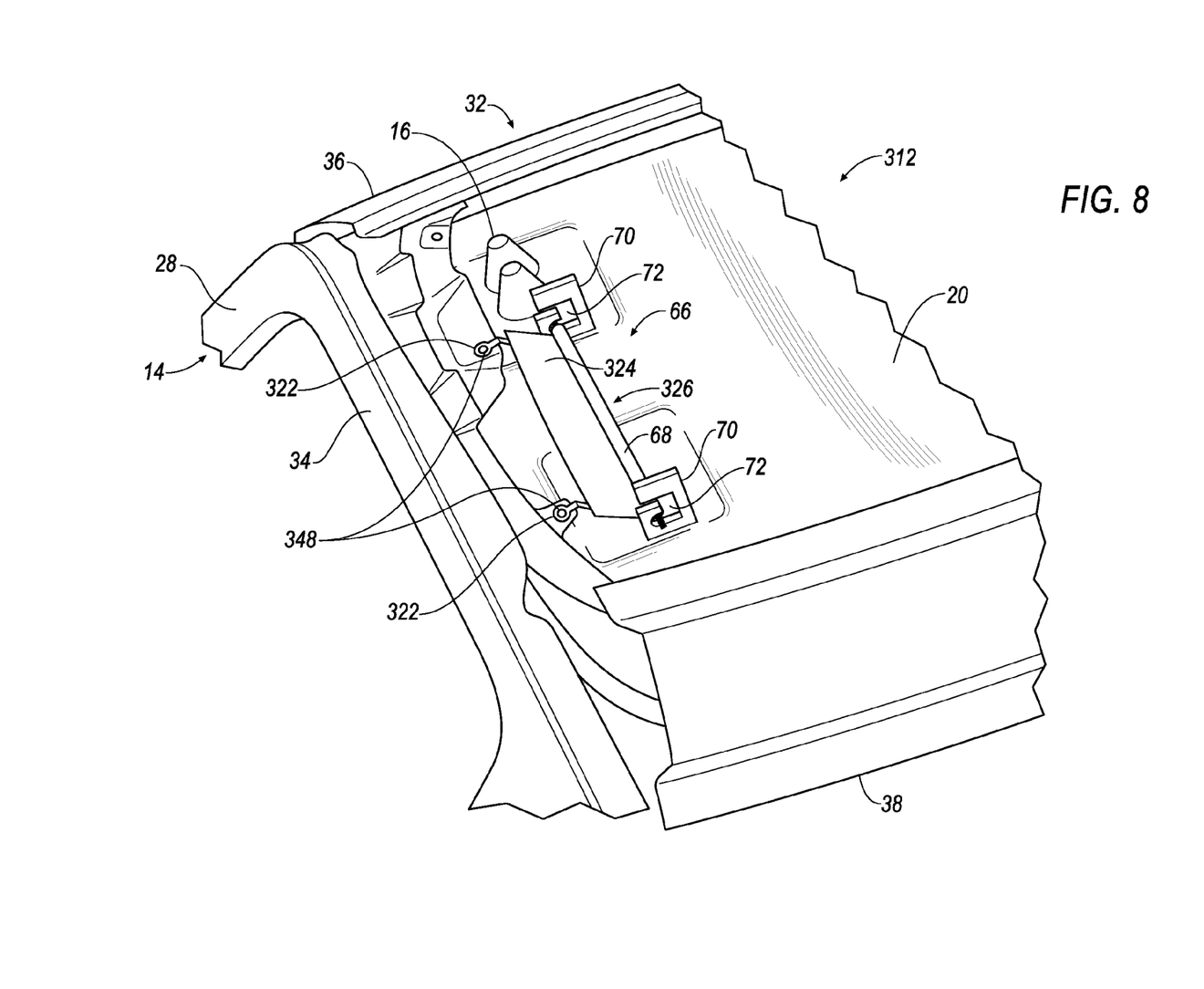
FIG. 8 is a top view of the canopy of FIG. 7 including the headliner.

The vehicle 10 includes an enclosure 26, 126, 226, 326. With reference to FIGS. 2-4, one embodiment of the enclosure 26 includes the frame 22 and the fabric partition 24. With reference to FIG. 5, another embodiment of the enclosure 126 includes the frame 122 and the fabric partition 124. With reference to FIG. 6, another embodiment of the enclosure 226 includes the frame 222 and the partition 224. With reference to FIGS. 7-8, another embodiment of the enclosure 326 includes the frame 322 and the fabric partition 324. Common numerals are used to identify common components in FIGS. 1-8.

The vehicle 10 may include a vehicle body 14, as shown in FIG. 2, for example. The vehicle body 14 may, for example, include pillars 28 and a roof frame 32. The pillars 28 may be connected to other components (not numbered) of the body 14 and/or to a frame (not numbered) of the vehicle 10. The body 14 may be supported on the frame of the vehicle 10. The roof frame 32 may be connected to the pillars 28 in any suitable manner, e.g., welding, fusing, fasteners, integral formation, etc.

With continued reference to FIG. 2, the pillars 28 and the roof frame 32 may define the roof opening 16 and a passenger compartment 30. The passenger compartment 30 may house seats (not shown), an instrument panel (not shown), etc. The roof frame 32 may include a pair of side rails 34 along sides of the passenger compartment 30, a front header 36 along a front of the passenger compartment 30, and a rear header 38 along a rear of the passenger compartment 30.

With reference to FIGS. 2-5, the roof frame 32 may include a longitudinal roof bow 40 extending between the rear header 38 and the front header 36. The roof bow 40 may be connected to the rear header 38 and to the front header 36 in any suitable manner, e.g., welding, fusing, fasteners, integral formation, etc. As shown in FIGS. 2-3, the roof bow 40 may include a plurality of lightening holes 42 spaced from each other along the longitudinal axis of the roof bow 40. The roof bow 40 may include a plurality of fastening holes 44, as described further below.

With reference to FIGS. 2 and 4, the vehicle 10 includes a headliner 20. As set forth above, the headliner 20 is supported by at least one of the vehicle body 14 and the roof 18. The headliner 20 may be fixed to the vehicle body 14 and/or the roof 18 in any suitable manner. The headliner 20 may be formed of any suitable material such as, for example, foam, plastic, and/or fabric, etc.

As set forth above, the vehicle 10 includes the enclosure 26, 126, 226, 326 coupled to the body 14 for at least partially covering the roof opening 16 for limiting movement of an object through the roof opening 16 during a vehicle 10 collision test, e.g., a rollover test, side pole test, etc. At least a portion of the enclosure 26, 126, 226, 326, e.g., the partition, may be formed of a material type and dimension that is flexible relative to the body 14 and roof 18.

The enclosure 26, 126, 226, 326 is at least partially disposed between the headliner 20 and the roof 18, as shown, for example, in FIG. 4. The frame 22, 122, 222, 322, for example, may be disposed between the headliner 20 and the roof 18. The partition 24, 124, 224, 324 is at least partially disposed between the headliner 20 and the roof 18.

The partition 24, 124, 224, 324 is disposed along the roof opening 16. Specifically, the partition 24, 124, 224, 324 may extend across the roof opening 16, i.e., from one side to another side, or may extend partially across the roof opening 16. The partition 24, 124, 224, 324 may be spaced from the roof 18 and/or spaced from the headliner 20. Alternatively, the partition 24, 124, 224, 324 may contact the roof 18 and/or the headliner 20.

The fabric partition 24, 124, 324 of the embodiments of FIGS. 2-4, 5, and 7-8 may be formed of any suitable type of material. The material of the fabric partition 24, 124, 324 may be woven yarn, fiber, filament, etc. The material of the fabric partition 24, 124, 324 may be a polymer. For example, the fabric partition 24, 124, 324 may be formed of woven nylon yarn, e.g., nylon 6, 6. Other suitable examples include polyether ether ketone (PEEK), polyetherketoneketone (PEKK), polyester, or any other suitable polymer. The fabric partition 24, 124, 324 may include a coating over the yarn, fiber, or filament, etc., such as, for example, silicone, neoprene, urethane, etc. For example, the coating may be polyorgano siloxane. Alternatively, the yarn, fiber, or filament, etc., may be uncoated.

With reference to the embodiment of the enclosure 26 shown in FIGS. 2-4, the enclosure 26 includes the frame 22 supporting the fabric partition 24 and being mounted to the body 14, e.g., the pillars 28 and/or the roof frame 32. The frame 22 includes a rail 46 and brackets 48 fixed to the rail 46. The brackets 48 are spaced from each other and engaged with the vehicle body 14, e.g., the pillars 28 and/or the roof frame 32. The rail 46 and brackets 48 may be formed of any suitable material, for example, such as steel, aluminum, etc. As shown in FIGS. 2-4, the vehicle 10 may include a two enclosures 26 with each enclosure 26 on opposite sides of the roof bow 40. The vehicle 10 may, alternatively, include any suitable number of enclosures 26.

With continued reference to the embodiment of FIGS. 2-4, the rail 46 may extend along a perimeter of the roof opening 16. The elongated rail 46 may include portions extending transversely to each other to define a frame opening 50 aligned with the roof opening 16. The portions of the elongated rail 46 may be integrally formed, e.g. by bending, as described further below. The fabric partition 24 may extend across the frame opening 50 between the portions of the elongated rail to cover the frame opening 50.

With continued reference to the embodiment of FIGS. 2-4, the rail 46 may be elongated and may be shaped to generally match the perimeter of the roof opening 16. The rail may have a round and tubular cross-section. The rail 46 may, for example, be formed from an extruded, tubular steel stock that may be formed, such as by bending, to achieve the final shape.

With continued reference to the embodiment of FIGS. 2-4, the frame 22 may include any suitable number of brackets 48. The brackets 48 may be fixed relative to the rail 46 in any suitable manner, e.g., welding, fusing, fasteners, integral formation, etc. Each bracket 48 may include a planar portion including a hole 52 for use in coupling the frame 22 to the roof frame 32. As shown in FIG. 2, the holes 52 may be aligned with holes 44 in the roof frame 32 and fasteners 54, e.g., threaded fasteners, may engage the holes 44, 52 to mount the enclosure 26 to the roof frame 32, as set forth further below.

With continued reference to the embodiment of FIGS. 2-4, the frame 22 may include locating tabs 56 configured to engage the lightening holes 42 in the roof bow 40. The locating tabs 56 may be used to temporarily support the enclosure 26 during installation to the roof frame 32. During installation of the enclosure 26 to the roof frame 32, the locating tabs 56 may be inserted in the lightening holes 42, respectively, to support the one side of the enclosure 26 while the other side of the enclosure 26 is lifted to align the holes 52 in the brackets 48 with the holes 44 in the roof frame 32 so that a fastener 54 may be engaged with the holes 44, 52 connect the frame 22 to the roof frame 32. The frame 22 may be mounted to the roof frame 32 such that the enclosure 26 is spaced from the roof bow 40, the roof 18, and/or the headliner 20, i.e., does not contact the roof bow 40, the roof 18, and/or the headliner 20.

The frame 22, including the brackets 48 and/or the locating tabs 56, may include a coating of a sound deadening and/or protective material. Similarly, the frame 22 may include a tape material adhered thereto, any appropriate coating (such as a S439 coating used to prevent corrosion), and/or a foam material for protecting the installation frame 22 and preventing buzzes, squeaks, rattles, and similar noises.

With continued reference to the embodiment of FIGS. 4, the fabric partition 24 may envelope the rail 46 of the frame 22. In other words, the fabric partition 24 may define a cavity 58 that houses the rail 46 of the frame 22. The fabric partition 24 may be formed by folding the fabric partition 24 over the rail 46 such that an upper portion 60 of the fabric partition 24 is disposed above the rail 46 and a lower portion 62 is disposed below the rail 46, as shown in FIG. 4. The upper portion 60 and the lower portion 62 may be fixed together, e.g., by stitching, along the perimeter, or a portion of the perimeter, of the fabric partition 24. The fabric partition 24 may define a plurality of gaps 64 corresponding to each bracket 48 so that the brackets 48 may extend from the frame 22 through the gaps 64 for connection with the roof frame 32.

With continued reference to the embodiment of FIGS. 2-4, the fabric partition 24 may define a sleeve (not shown) defining the cavity 58 and receiving the rail 46 for assisting in the retention of the fabric partition 24 to the rail 46. The sleeve may be integrally formed with the rest of the fabric partition 24. For example, the sleeve may formed by stitching spaced from and extending along the perimeter of the fabric partition 24 in a suitable shape and size to receive the rail 46.

With continued reference to the embodiment of FIGS. 2-4, the fabric partition 24 and the frame 22 may be configured to evenly spread and/or stretch the fabric partition 24 across the frame opening 50. The fabric partition 24 may be configured to have sufficient compliance to allow the headliner 20 to be properly installed to the vehicle body 14.

In the embodiment of FIG. 5, the frame 122 of the enclosure 126 includes a plurality of brackets 148 spaced from each other for connecting the fabric partition 124 to the roof frame 32. The brackets 148 are connected to each other by the fabric partition 124, i.e., the frame 122 of the embodiment of FIG. 5 does not include the rail of the embodiment of FIGS. 2-4. The brackets 148 are fixed to the fabric partition 24. For example, the brackets 148 may be stitched, adhered, etc., to the fabric partition 24. The brackets 148 may be connected to the roof frame 32 in any suitable manner, e.g., with fasteners.

With continued reference to FIG. 5, the brackets 148 and the fabric partition 124 may be configured to extend across a portion of the roof opening 16. Alternatively, the brackets 148 and the fabric partition 124 may be configured to extend across the entire roof opening 16.

In the embodiment of FIG. 6, the frame 222 and the partition 224 may be integrally formed, i.e., formed together simultaneously as a single continuous unit. For example, the frame 222 and the partition 224 may be formed together from a blank that is subsequently stamped. Alternatively, the frame 222 and the partition may be formed separately and subsequently fixed to each other in any suitable fashion, such as by welding, adhering, fastening, etc. The frame 222 and the partition 224 may be integrally formed with the roof bow 40, as shown in FIG. 6, e.g., stamped from a single blank, or alternatively may be formed separately from the roof bow 40 and subsequently fixed to the roof bow 40 in any suitable fashion, such as by welding, adhering, fastening, etc. The frame 222, the partition, and the roof bow 40 may, for example, may be formed of metal.

With continued reference to the embodiment of FIG. 6, the frame 222 of the enclosure 226 may be fixed to the roof frame 32 in any suitable manner. For example, the frame 222 may be riveted to the roof frame 32. Alternatively, for example, the frame 222 may be welded to the roof frame 32, fastened to the roof frame 32 with threaded fasteners, etc.

In the embodiment of FIGS. 7-8, the enclosure 326 may include a rotatable mechanism 66 engaged with the headliner 20. The fabric partition 324 may be retractably extendable from the rotatable mechanism 66. For example, the rotatable mechanism 66 may be spring loaded for automatically retracting the fabric partition 324 as the headliner 20 is installed to the at least one of the vehicle body 14 and the roof 18. Specifically, the rotatable mechanism 66 may, for example, include a dowel (now shown) rotatably supported in a case 68 and engaged with the fabric partition 24. At least one spring (not shown) may be engaged with the dowel and the case 68 to spring load the dowel in the case 68 to retract slack in the fabric partition 324 into the case 68.

With continued reference to FIGS. 7-8, the enclosure may include a frame 322 connected to the fabric partition 324 for coupling the fabric partition 324 to the vehicle body 14, e.g., the roof frame 32. The frame 322, for example, may include brackets 348 that are connected to the vehicle body 14 with threaded fasteners, or in any other suitable manner.

As shown in FIG. 8, the headliner 20 may include a retention feature 70 for fixing the rotatable mechanism 66 to the headliner 20. The retention feature 70 may be integral with the rest of the headliner 20 and may define a slot 72 for receiving the case 68 of the rotatable mechanism 66. The brackets 348, alternatively, may be mounted to the headliner 20 and the rotatable mechanism 66 may be mounted to the vehicle body 14. As shown in FIG. 8, the headliner 20 may include two retention features 70, and, alternatively, may include any suitable number of retention features 70.

With reference to FIG. 7, during assembly of the vehicle 10, the frame 322 of the enclosure 326, e.g., the brackets 348, may be mounted to the vehicle body 14. Since the rotatable mechanism 66 retracts slack in the fabric partition 324 into the case 68 of the rotatable mechanism 66, the rotatable mechanism 66 is retracted toward the brackets 348, as shown in FIG. 7. The vehicle 10 may proceed down the assembly line with the enclosure 326 in such a retracted position.

With reference to FIG. 8, as the headliner 20 is lifted for connection to the vehicle body 14, the rotatable mechanism 66 may be attached to the retention feature 70 of the headliner 20. In particular, the rotatable mechanism 66 may be pulled toward the headliner 20 and, during such movement, the fabric partition 224 extends from the rotatable mechanism 66. After the rotatable mechanism 66 is connected to the retention feature 70 on the headliner 20, the headliner 20 is lifted toward the roof frame 32 and, during such movement, the rotatable mechanism 66 retracts slack from the fabric partition 24. As such, when the headliner 20 is engaged with the vehicle body 14, the rotatable mechanism pulls the fabric partition 224 taut. Once the headliner 20 is engaged with the vehicle body 14, the rotatable mechanism may be locked to prevent further extension of the fabric partition 24 from the rotatable mechanism.

The vehicle 10 in the Figures is shown, for example, as a pickup truck but it should be understood that the present disclosure is applicable in any type of vehicle 10 including, but not limited to, a sedan, a cross-over, a sport utility, a station wagon, a minivan, a van or any other known or future developed type of vehicle.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle canopy comprising:
   a vehicle body defining a roof opening;
   a roof connected to the vehicle body across the roof opening;
   a headliner supported by at least one of the vehicle body and the roof;
   a frame supported by the vehicle body, the frame including brackets spaced from each other and engaged with the vehicle body; and
   a fabric partition engaged with the frame and extending across the roof opening between the headliner and the roof.

2. The vehicle canopy as set forth in claim 1 wherein the frame includes an elongated rail and the fabric partition defines a cavity receiving the rail.

3. The vehicle canopy as set forth in claim 2 wherein the fabric partition includes an upper portion and a lower portion defining the cavity and enveloping the rail.

4. The vehicle canopy as set forth in claim 1 wherein the frame includes an elongated rail extending along a perimeter of the roof opening.

5. The vehicle canopy as set forth in claim 1 wherein the frame includes an elongated rail including portions extending transversely to each other to define a frame opening aligned with the roof opening, the fabric partition extending across the frame opening between the portions of the elongated rail to cover the frame opening.

6. The vehicle canopy as set forth in claim 1 wherein the frame is disposed between the headliner and the roof.

7. The vehicle canopy as set forth in claim 6 wherein the fabric partition is spaced from the roof.

8. The vehicle canopy as set forth in claim 1 wherein the frame includes an elongated rail fixed to the brackets.

9. The vehicle canopy as set forth in claim 8 wherein the fabric partition defines a cavity receiving the rail.

10. The vehicle canopy as set forth in claim 9 wherein the fabric partition defines gaps and the brackets extend from the cavity through the gaps.

11. The vehicle canopy as set forth in claim 8 wherein the fabric partition includes an upper portion and a lower portion defining the cavity and enveloping the rail.

12. The vehicle canopy as set forth in claim 1 further comprising a rotatable mechanism engaged with the headliner, the fabric partition retractably extendable from the rotatable mechanism.

13. The vehicle canopy as set forth in claim 12 wherein the rotatable mechanism is spring loaded for automatically retracting the fabric partition as the headliner is installed to the at least one of the vehicle body and the roof.

14. The vehicle canopy as set forth in claim 1 wherein the fabric partition is formed from woven nylon.

15. The vehicle canopy as set forth in claim 14 wherein the frame is formed of metal.

16. The vehicle canopy as set forth in claim 1 wherein the roof includes at least one lightening hole, and wherein the frame includes at least one locating tab configured to engage the lightening holes to support the frame during installation of the frame to the roof.

17. The vehicle canopy as set forth in claim 16 wherein the roof includes a front header, a rear header, and a longitudinal roof bow extending between the rear header and the front header, wherein a plurality of the lightning holes are spaced from each other along the longitudinal roof bow.

18. The vehicle canopy as set forth in claim 16 wherein the at least one locating tab is spaced from the brackets.

19. The vehicle canopy as set forth in claim 16 wherein the at least one locating tab includes a coating of sound deadening material.

20. The vehicle canopy as set forth in claim 1 wherein the brackets include a coating of sound deadening material.

* * * * *